April 7, 1925.  1,532,630
N. E. METHLIN
ARRANGEMENT FOR LAUNCHING AEROPLANES IN THE AIR FROM THE
GROUND OR FROM A VESSEL
Filed July 28, 1924   9 Sheets-Sheet 1

Inventor
Nicolas Emilien Methlin
By
Mauro, Cameron, Lewis & Kerkam
Attorneys

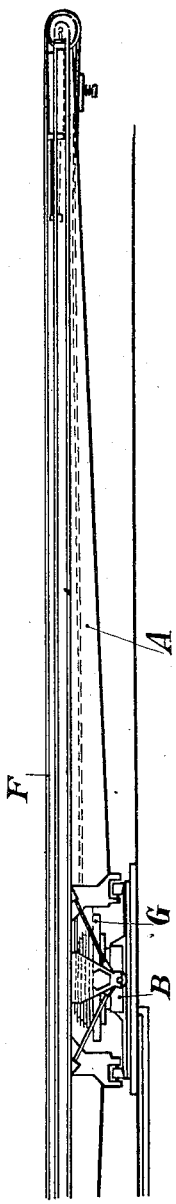
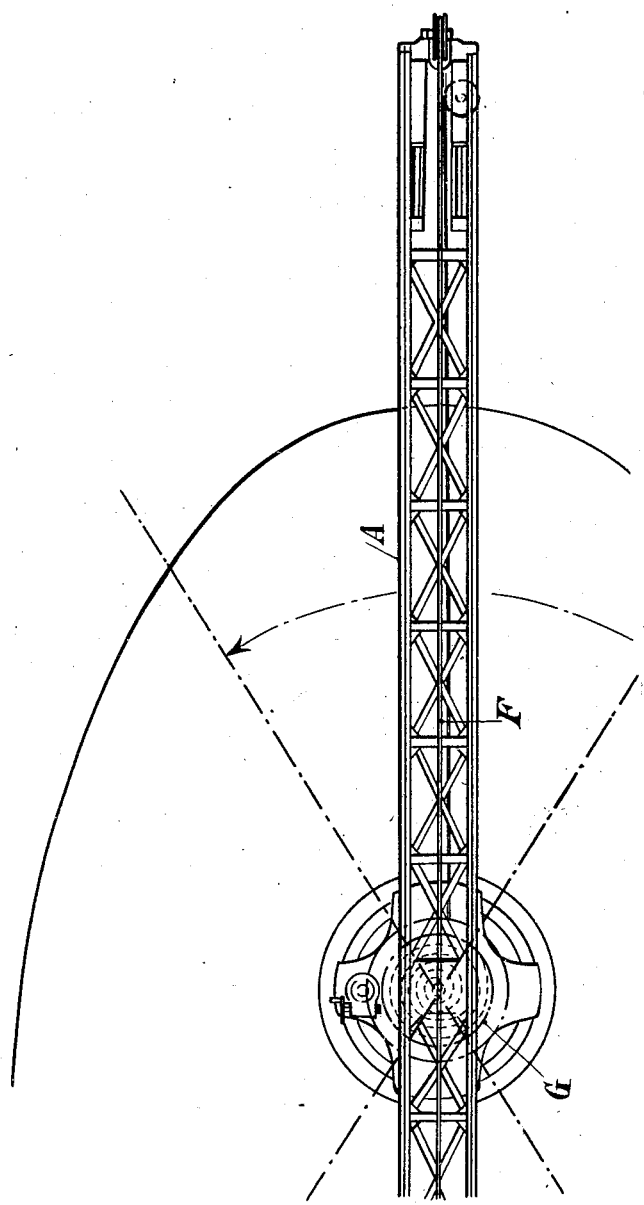

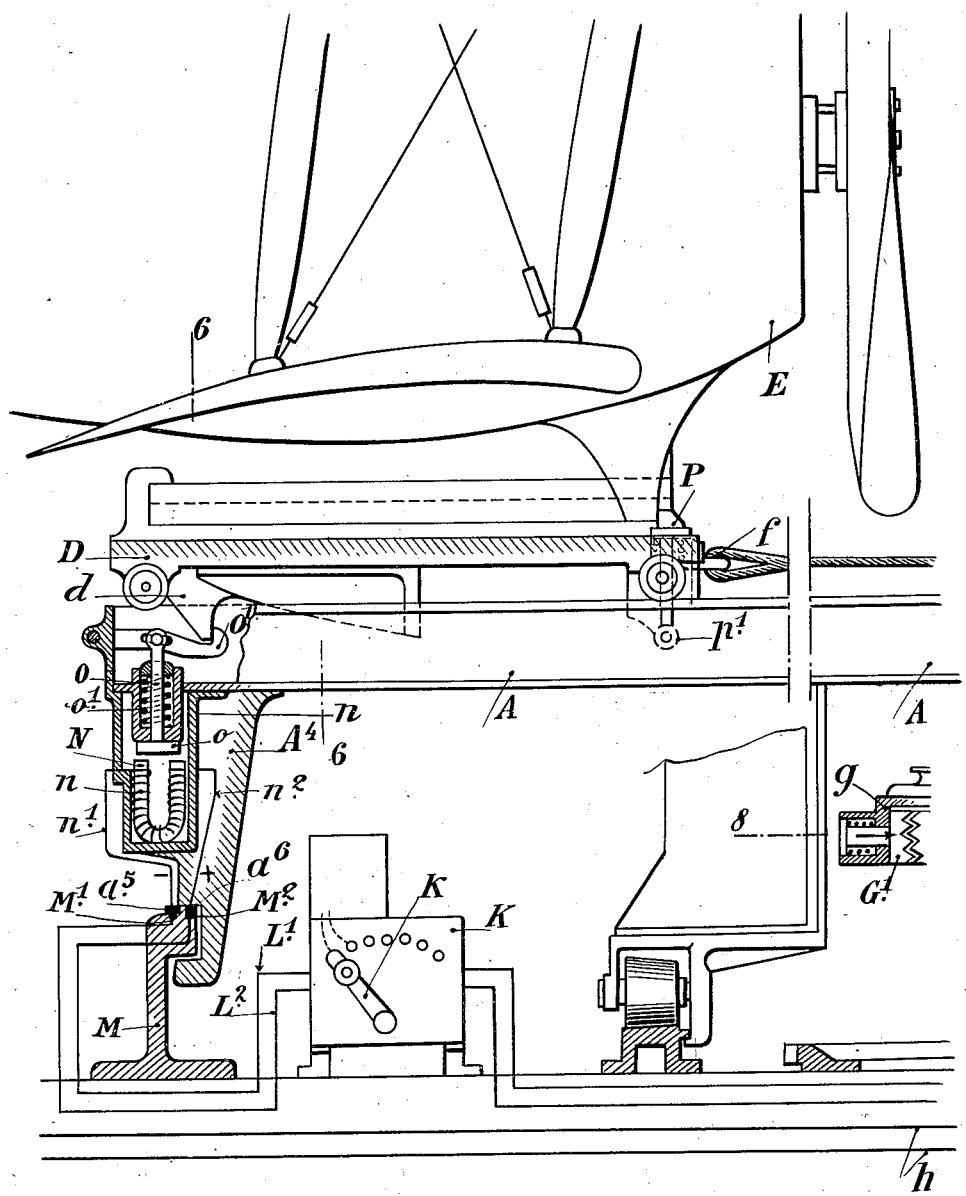

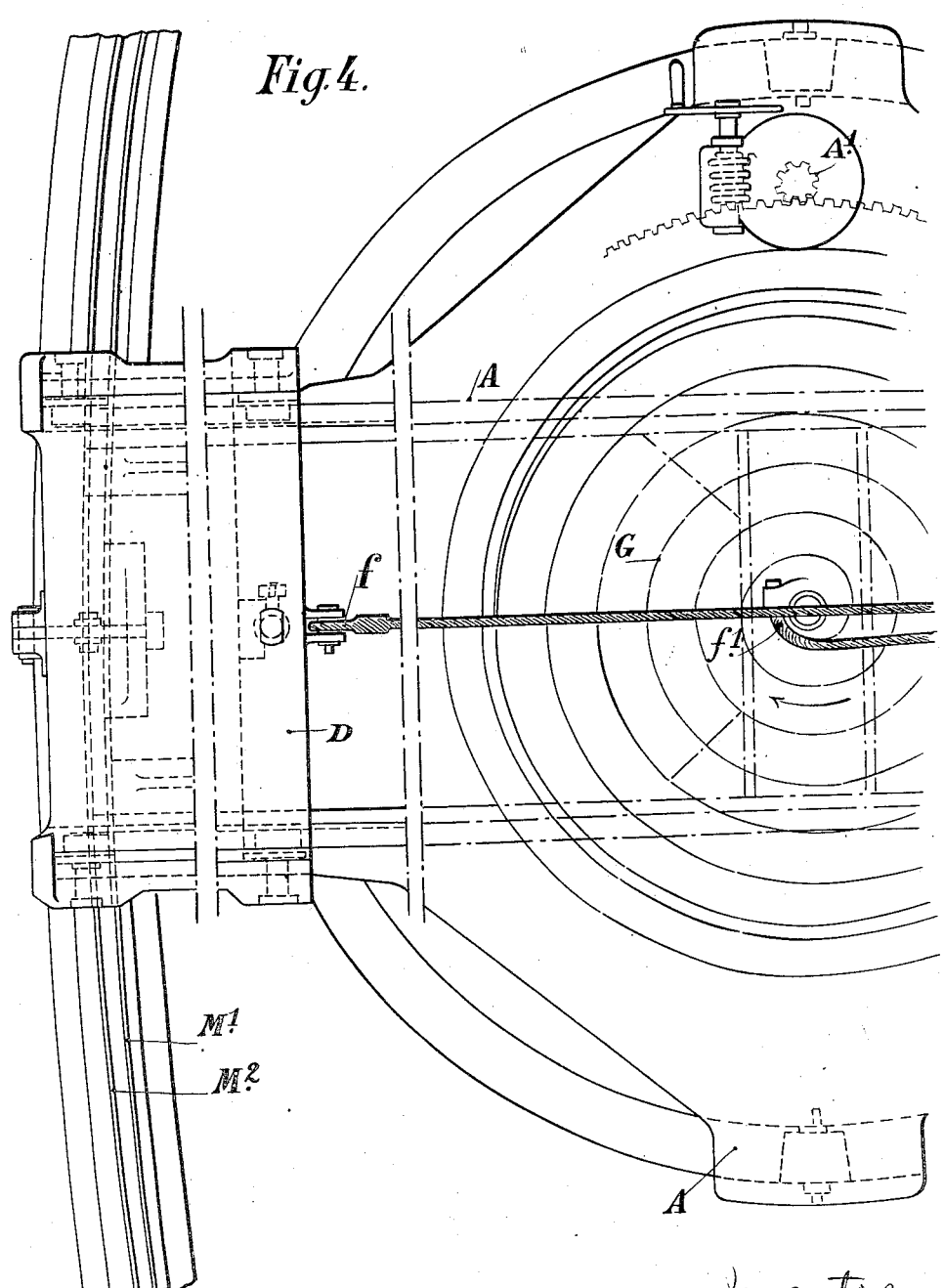

April 7, 1925. 1,532,630
N. E. METHLIN
ARRANGEMENT FOR LAUNCHING AEROPLANES IN THE AIR FROM THE
GROUND OR FROM A VESSEL
Filed July 28, 1924   9 Sheets-Sheet 6
Fig. 4A
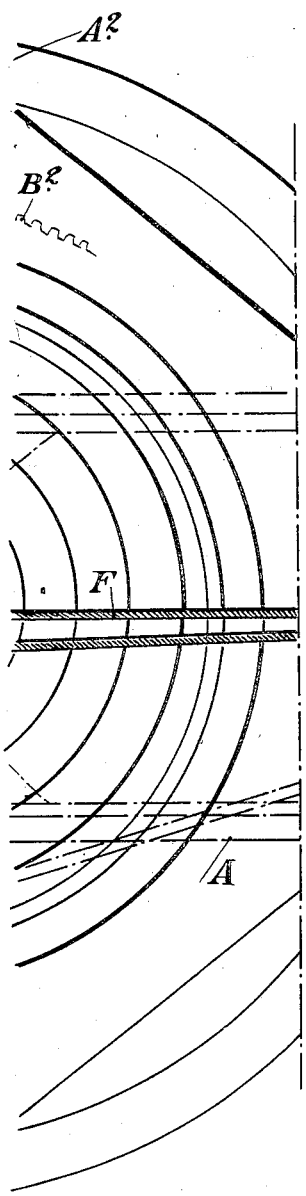
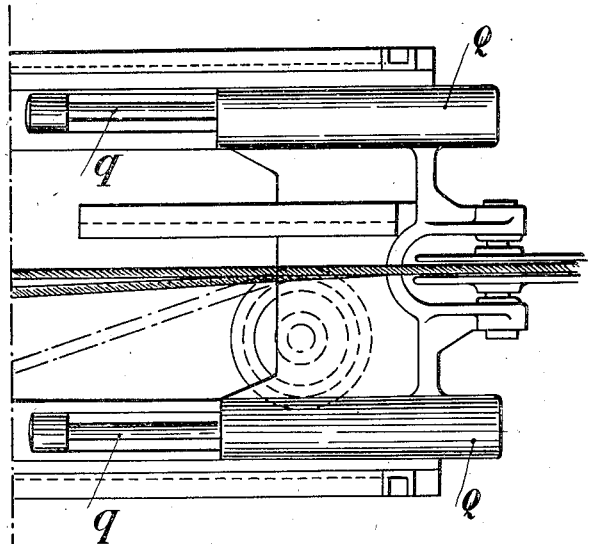
Inventor
Nicolas Emilien Methlin
By Mauro, Cameron, Lewis & Kirkam
Attorneys

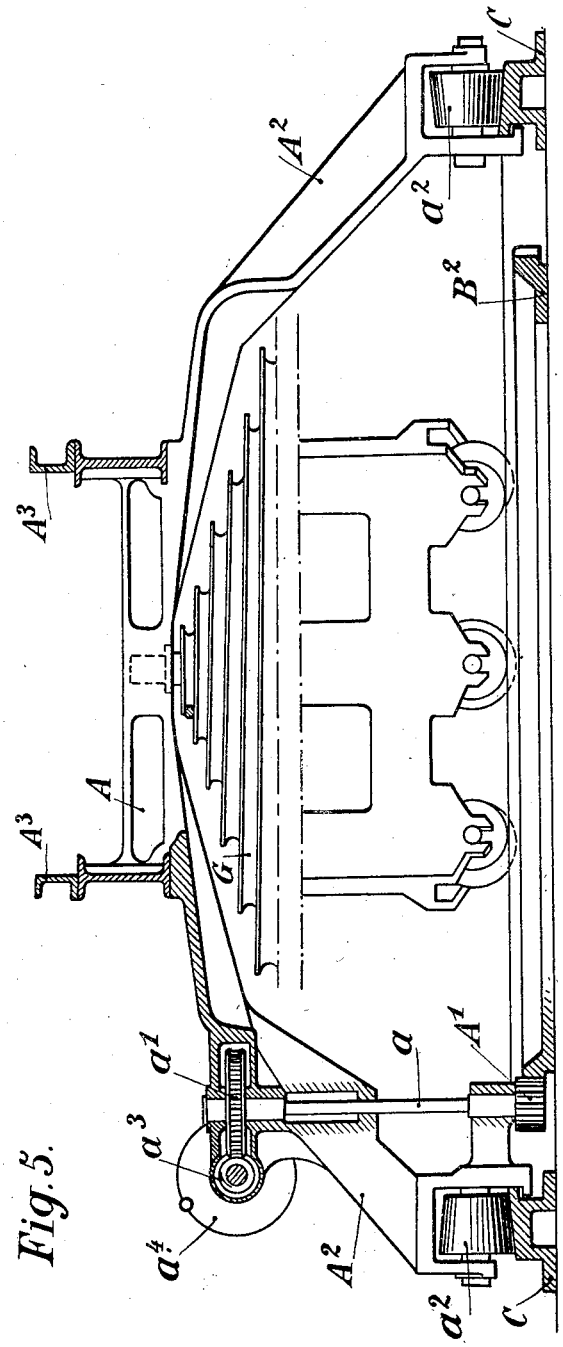

April 7, 1925.  1,532,630
N. E. METHLIN
ARRANGEMENT FOR LAUNCHING AEROPLANES IN THE AIR FROM THE
GROUND OR FROM A VESSEL
Filed July 28, 1924  9 Sheets-Sheet 8

Inventor
Nicolas Emilien Methlin
By
Mauro, Cameron, Lewis & Massie
attorneys

April 7, 1925.  1,532,630
N. E. METHLIN
ARRANGEMENT FOR LAUNCHING AEROPLANES IN THE AIR FROM THE
GROUND OR FROM A VESSEL
Filed July 28, 1924    9 Sheets-Sheet 9

Patented Apr. 7, 1925.

1,532,630

UNITED STATES PATENT OFFICE.

NICOLAS EMILIEN METHLIN, OF PARIS, FRANCE, ASSIGNOR TO SCHNEIDER & CIE., OF PARIS, FRANCE, A LIMITED JOINT STOCK COMPANY OF FRANCE.

ARRANGEMENT FOR LAUNCHING AEROPLANES IN THE AIR FROM THE GROUND OR FROM A VESSEL.

Application filed July 28, 1924. Serial No. 728,751.

*To all whom it may concern:*

Be it known that I, NICOLAS EMILIEN METHLIN, a citizen of the Republic of France, resident of Paris, France, have invented new and useful Improvements in Arrangements for Launching Aeroplanes in the Air From the Ground or From a Vessel, which is fully set forth in the following specification.

This invention relates to an arrangement for effecting the launching of aeroplanes in the air from off the ground or from a vessel, the arrangement being more particularly applicable in the latter case. The new arrangement which is more particularly applicable in cases where the distance available for the aeroplane to run before rising is very limited, comprises, in the known manner, a platform capable of being set in a desired direction, and which is provided with a track for a carriage on which the aeroplane is secured.

The new arrangement is particularly characterized by the feature that the movement on its track of the carriage which carries the aeroplane is produced by the mechanical winding of a traction cable on a rotary drum, which is put in motion by being connected at a determined moment with a motor.

The invention also comprises a series of arrangements of details of which the characteristics are indicated hereinafter.

One form of carrying the invention into effect is illustrated by way of example on the accompanying drawings in which:

Figure 1 with Figure 1ᵃ is a longitudinal elevation of a general arrangement.

Figure 2 with Figure 2ᵃ is a corresponding view in plan.

Figure 3 with Figure 3ᵃ is an elevation to a larger scale, partly in section along the axis of the motor and of the winding drum driven by the latter.

Figure 4 with Figure 4ᵃ is a corresponding plan of a part thereof.

Figure 5 is a section along the line 5—5, Figure 3.

Figure 1:
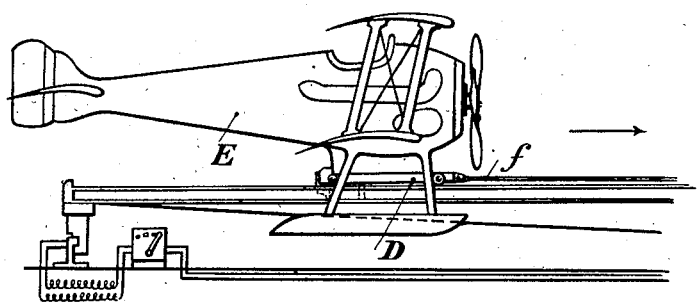
Figure 2:
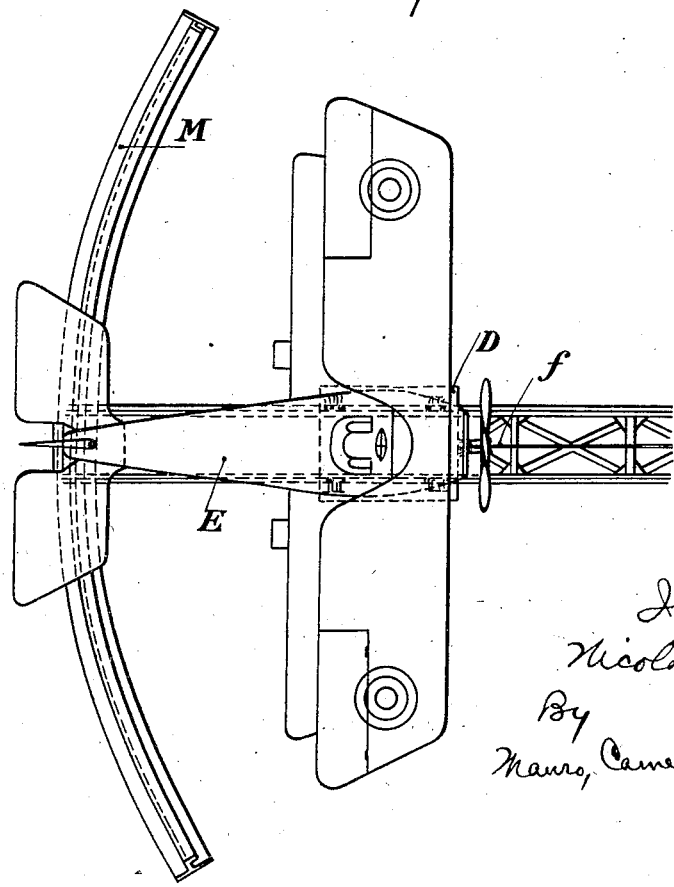

The arrangement comprises, in the known manner, a beam or platform A capable of being set in the desired direction, mounted for this purpose on a vertical pivot B of which the upper end $b$ is pivoted in the said beam A, whilst the lower end $b^1$ is held in a footstep bearing $B^1$ suitably anchored to the vessel or to appropriate foundations. The directional setting of the platform by rotation around the pivot B, may be obtained by suitable known mechanisms and may comprise, for example as shown on the drawing, a fixed toothed crown wheel $B^2$ having its centre in the axis of the pivot B, and on which turns a pinion $A^1$, keyed to a vertical shaft $a$ pivoting in a yoke $A^2$, carrying the platform A; the said yoke being supported by means of running rollers $a^2$ on a fixed circular track C concentric with the crown wheel $B^2$. The motions may be transmitted to the shaft $a$ by means of a worm $a^3$ engaging with a worm wheel $a^1$ keyed to the said shaft $a$, the worm $a^3$ being operated by means of a hand-wheel $a^4$.

On the beam or platform A, is arranged a track $A^3$ on which will run a carriage D to which the aeroplane E is secured by any known means, not shown. The launching of the carriage D is effected by pulling on the cable F, which is suitably attached to the said carriage by one end $f$, for this purpose.

In accordance with the invention, the pull on the cable F is obtained by winding it on a rotary drum G, which is put in motion by being coupled to a motor H—I. According to a practical form of construction of the invention, the common shaft of the motor H and the loose drum G is the axle B about which the platform A turns.

The motor H—I which may be put in motion at any moment by means of a current, supplied thereto from land or on board the vessel, through the conductors $h$, acquires at the end of a suitable time a speed which it communicates, by the flywheel I, to the drum G, as soon as the coupling between these two parts, flywheel and motor, is effected.

In accordance with the invention this coupling between the drum G and the flywheel I is preferably effected by electromagnets $I^1$, $I^2$ etc., the cores of which are arranged so as to project radially with respect to the nave of the flywheel I, and carry each a pole piece with pole pieces $i^1$, $i^2$, etc. These pole pieces form a part of the jaws of an electromagnetic coupling; the corresponding soft iron co-operating parts are constituted by shoes $G^1$ which are movable radially, like spring buffers, in a crown wheel $g$ enveloping the electromagnets and built as a projection under the winding drum G. The springs $g^1$ normally hold the soft iron pieces $G^1$ away from the armatures of the electromagnets. The excitation of the electromagnets is effected by means of a current flowing in the wires J connected to the conducting rings $J^1$, $J^2$ mounted on a frame which may be that of the armature of the motor. On the ring $J^1$ moves the brush $I^4$ attached to the flywheel I, and to which is connected one end of the winding of the series of electromagnets $I^1$, $I^2$ etc. The other end of the winding is connected to a brush $I^5$ carried by the flywheel I, and movable on the ring $J^2$.

In order to ensure a gradual coupling of the flywheel I and the drum G, the strength of the exciting current is increased gradually by means of the handle $k$ of a rheostat K installed in a stationary position. One of the contact studs of this rheostat is connected by means of the conductors $L^1$, $L^2$ to an electromagnetic arrangement for releasing the carriage which carries the aeroplane D. In the example shown, the said contact stud leading from the rheostat is connected by the conductors $L^1$, $L^2$ to the conducting rings $M^1$ and $M^2$ arranged on a fixed sector M. In contact with these rings, brushes $a^5$, $a^6$ are moved along the contact rings $M^1$ and $M^2$, the said brushes being carried by a member $A^4$ in the form of a hook, which projects under the beam A; these hooks serve at the same time as catches for the back of the beam in all its positions of directional setting. The brushes $a^5$, $a^6$, are connected, by conductors $n^1$, $n^2$ to the winding $n$ of an electromagnet N, which is situated in a pocket on the hook $A^4$ and which when excited attracts the head $o$ provided on a soft iron rod O normally held up by a spring $o^1$; the rod O is pivoted to a hook $O^1$ the nose of which normally engages with a piece $d$ which projects below the carriage D thus acting as a detent.

The winding drum G to which is attached the end $f^1$ of the cable F, is preferably arranged in the form of a spiral, the turns of which can be arranged so as to increase according to the law of acceleration of the speed of the aeroplane during launching.

Figure 3A:
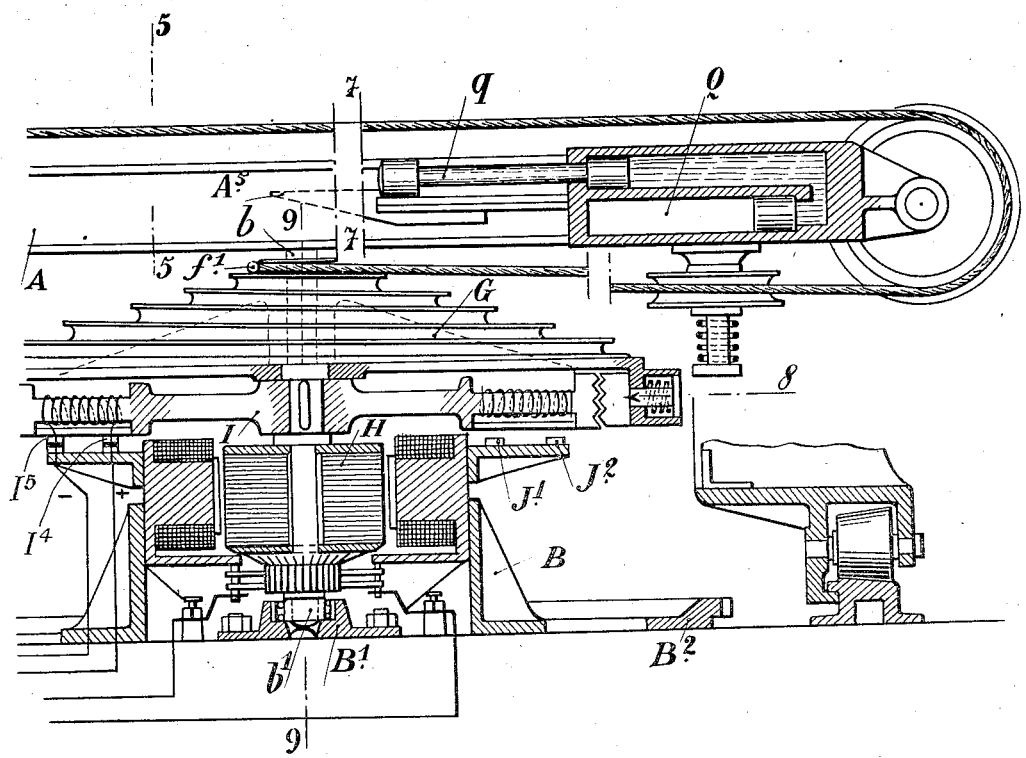
Figure 6:
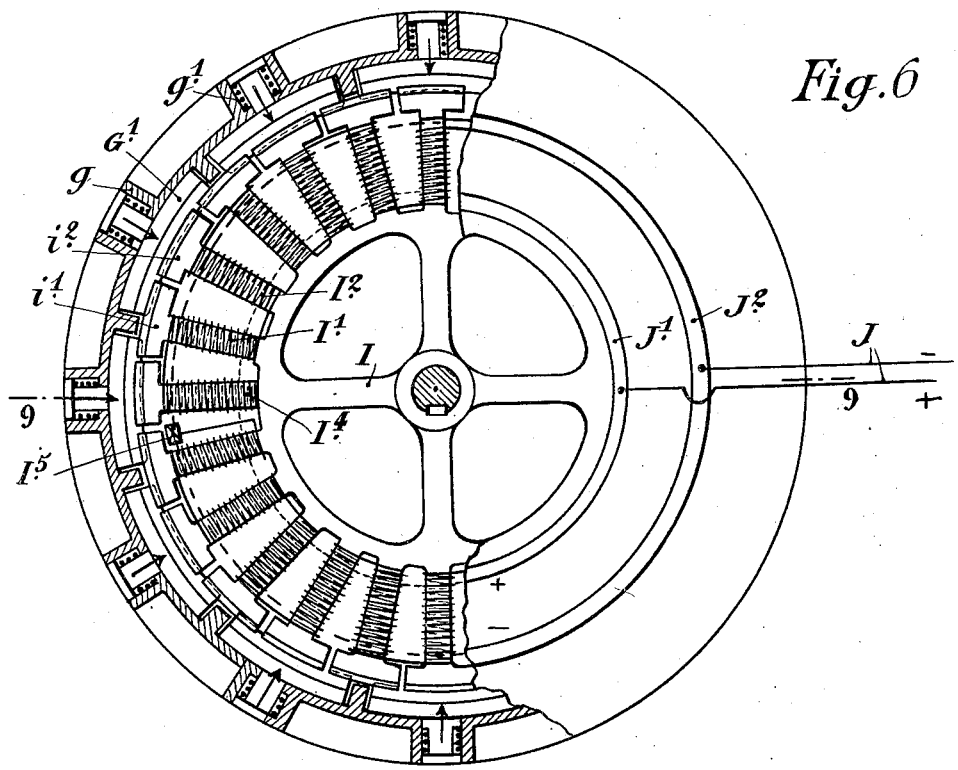
Figure 6 is a sectional plan along the line 8—8 of Figure 3.
Figure 7:
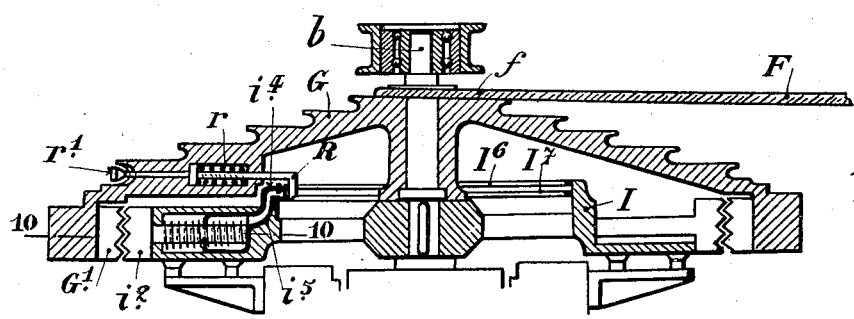
Figure 7 is a section along the line 9—9 of Figure 6.
Figure 8:
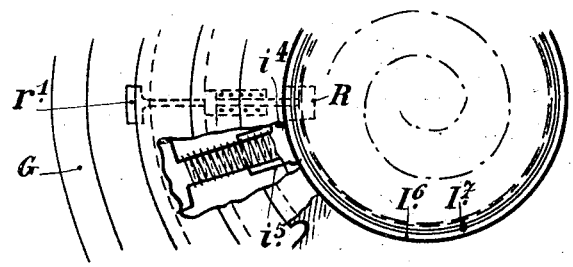
Figure 8 is a sectional plan of a part of Figure 7 along the line 10—10.
Figure 9:
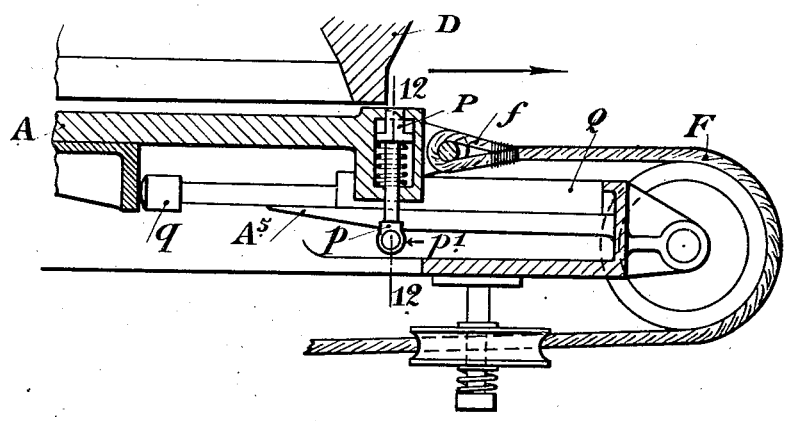
Figure 9 is a sectional elevation of a part showing the carriage which carries the aeroplane at the end of the launching course at the moment of release of the aeroplane.
Figure 10:
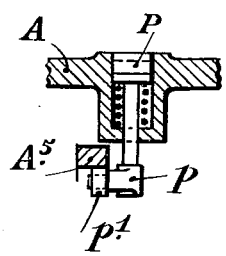
Figure 10 is a sectional elevation along the line 12—12 of Figure 9.

In order to launch an aeroplane of which the supporting carriage D is normally held fast in the position indicated on Figures 3 and 4, the motor H is set in motion, and, when the flywheel I has acquired sufficient momentum, the handle $k$ is operated. In this manner the electromagnets $I^1$, $I^2$, $I^3$ etc., are excited gradually. By this gradual excitation, a first winding sufficient to tighten the cable F is secured. When the cable is so stretched the handle is moved on the desired contact stud for transmitting the current along the conductors $L^1$, $L^2$; the excitation of the electromagnets N assuring the release of the retaining catch $O^1$. Then the cable winds on the successive turns of the drum in a spiral, thus effecting the travelling of the cable, of the carriage, and of the aeroplane E at gradually increasing speeds.

The releasing of the aeroplane at the end of its course on the launching track $A^3$ is effected automatically.

As shown on the drawings, the aeroplane is held in front by a spring bolt P, at the lower end of which is mounted in a fork $p$, a roller $p^1$. At the end of the course the roller $p^1$ meets an inclined plane $A^5$ carried by the beam A, which causes the bolt P to move out of the way; one or more hydropneumatic buffers Q absorb the shock of the carriage which carries the aeroplane D, at the end of its course, the carriage abutting against the piston $q$ of these shock absorbers.

The invention comprises an automatic breaker of the excitation circuit of the electromagnetic coupling between the winding drum and the motor. A contact finger R, movable radially in the drum G, is held in contact, by a spring $r$, with conducting rings $I^6$, $I^7$ attached to the flywheel I, and to which are connected the two ends $i^4$, $i^5$ of the winding of the electromagnetic coupling, at the point where there is an interruption on one of the radial arms of the flywheel I. Normally the winding circuit is closed across the rings $I^6$, $I^7$ by the conducting finger R. The automatic breaking is effected by the separation of the finger R from the rings $I^6$, $I^7$, which separation is produced, at the end of the winding operation of the cable R on the drum, by the pressure of the cable on the projecting head $r^1$ of the rod R.

While the form of construction illustrated is the one which it is preferable to adopt, it is to be understood that it is not absolutely necessary to make use of the pivot of the platform A as shaft for the motor and the winding drum. This shaft may be an independent one parallel to the axis of the vertical pivot; it may be arranged horizontally or at any desired inclination. It is quite evident also that instead of one traction cable, two may be used, each winding on a separate drum. The return of the carriage D to the position of departure may be secured by hand or mechanically, and if desired by means of a winch.

Having now particularly described and ascertained the nature of the said invention and in what manner the same is to be performed, what is claimed is—

1. In a device for launching aeroplanes, the combination of a motor, a flywheel, a drum and a track all mounted to turn on a common vertical axis, a clutch between said flywheel and drum, a carriage on the track, and a cable connecting said drum and carriage.

2. In a device for launching aeroplanes, the combination of an electric motor, a flywheel, a drum and a track, all mounted to turn on a common vertical axis, an electromagnetic clutch between the flywheel and the drum, a carriage on the track, and a cable connecting said drum and carriage.

3. In a device for launching aeroplanes, the combination of an electric motor, a flywheel, a drum and a track, all mounted to turn on a common vertical axis, an electromagnetic clutch between the fly-wheel and the drum, a carriage on the track, means for turning said track on the axis independently of the other elements, a carriage on the track, and a cable connecting said drum and carriage.

4. In a device for launching aeroplanes, the combination of a motor, a flywheel, a drum and a track, all mounted to turn on a common vertical axis, a clutch between said flywheel and drum, means gradually operating said clutch to connect the drum and flywheel, a carriage on the track, and a cable connecting said drum and carriage.

5. In a device for launching aeroplanes, the combination of a motor, a flywheel, a drum and a track, all mounted to turn on a common vertical axis, a clutch between said flywheel and drum, means gradually operating said clutch to connect the drum and flywheel, automatic means releasing the clutch at a predetermined point, a carriage on the track, and a cable connecting said drum and carriage.

6. In a device for launching aeroplanes, the combination of a motor, a flywheel, a drum and a track, all mounted to turn on a common vertical axis, a clutch between said flywheel and drum, a carriage on the track, a cable connecting said drum and carriage, means retaining the aeroplane on the carriage, a brake for the carriage near the end of its travel, and means automatically opening said clutch and releasing the aeroplane from the carriage.

7. In a device for launching aeroplanes, the combination of a motor, a flywheel, a drum and a track all mounted to turn on a common vertical axis, a clutch between said flywheel and drum, a carriage on the track, a cable connecting said drum and carriage, and a hydro-pneumatic brake for said carriage.

In testimony whereof I have signed this specification.

NICOLAS EMILIEN METHLIN.

Witnesses:
ANDRÉ NOSTICKER,
LOUIS GARDET.